United States Patent [19]
Marks et al.

[11] Patent Number: 4,745,675
[45] Date of Patent: May 24, 1988

[54] METHOD OF MANUFACTURING LAMINATIONS FOR ELECTRICAL APPARATUS

[75] Inventors: Stephen W. Marks, Washington, Mich.; Theodore G. Seeger, Middletown, Ind.

[73] Assignee: General Motors Corporation, Detroit, Mich.

[21] Appl. No.: 478,658

[22] Filed: Mar. 25, 1983

[51] Int. Cl.⁴ .............................................. H02K 15/02
[52] U.S. Cl. ........................................ 29/596; 29/605; 140/71 R; 310/42; 310/216
[58] Field of Search ................. 29/596, 598, 605, 609; 310/216, 42, 154, 155, 156; 140/71 R

[56] References Cited

U.S. PATENT DOCUMENTS

| | | | |
|---|---|---|---|
| 3,606,674 | 9/1971 | Givan | 29/596 |
| 3,762,042 | 10/1973 | Abe et al. | 310/216 X |
| 3,983,433 | 9/1976 | Sims | 310/216 X |
| 4,347,449 | 8/1982 | Beau | 29/598 X |

FOREIGN PATENT DOCUMENTS 894422 12/1944 France ................................. 29/596

Primary Examiner—Carl E. Hall
Attorney, Agent, or Firm—C. R. Meland

[57] ABSTRACT

A method of manufacturing a stator lamination for a dynamoelectric machine. A length of steel wire is formed into alternate straight and undulated portions and is formed into a coil such that the inner turn of the coil coprresponds to the undulated portion and the outer turn corresponds to the straight portion of the wire. The coil of wire is placed in a die cavity of a die that has a configuration corresponding to a stator lamination. The loops of the undulated portion are placed in radially extending grooves of the die cavity and the outer turns of the coil are placed in an annular groove of the die cavity. The die and a punch are utilized to coin the wire to the shape of the die cavity.

3 Claims, 2 Drawing Sheets

METHOD OF MANUFACTURING LAMINATIONS FOR ELECTRICAL APPARATUS

This invention relates to a method of manufacturing laminations formed of magnetic material for use in electrical apparatus and more particularly to a method of manufacturing annular stator laminations for the stator of a dynamoelectric machine, such as an alternating current generator.

An important aspect of the manufacture of laminations for dynamoelectric machines is to reduce the amount of scrap incident to the manufacture of laminations. A prior art patent that describes the scrap problem and one solution to it is the Givan U.S. Pat. No. 3,606,674. In the Givan patent tubular lengths of steel material are folded to form an annular stator lamination part which is subsequently pierced to form wire receiving slots. The method described in the Givan patent achieves a reduction in scrap due to the fact that the tubular part is of such a size as to form one folded lamination. Nevertheless, there is some scrap associated with the method described in the Givan patent corresponding to the portions of the folded laminations that are pierced to form the slots.

One of the principal objects of the present invention is to provide a method of manufacturing a stator lamination which reduces scrap to virtually zero. Thus, by the use of the method of this invention there is no scrap even associated with the formation of the slots of the stator lamination. This is achieved by providing a punch and die apparatus wherein the parts are configured such that the die cavity has the exact shape of a finished stator lamination. A length of steel wire is shaped to form a series of loops that define an undulated portion. The loops are of such a shape and dimension that the wire can be placed in the die cavity with the loops positioned within radially extending portions of the die cavity that form the stator teeth. The length of steel wire further has circular portions extending circumferentially of the undulated portion which is placed in an annular groove portion of the die cavity that is shaped to form the yoke of the stator lamination. With the wire positioned in the die cavity a punch, having teeth and slots, is forced into the die cavity and the die and punch are moved together with sufficient force to coin the steel wire to the configuration of the die cavity. This provides a stator lamination having the exact configuration of the die cavity.

IN THE DRAWINGS

Figure 3:
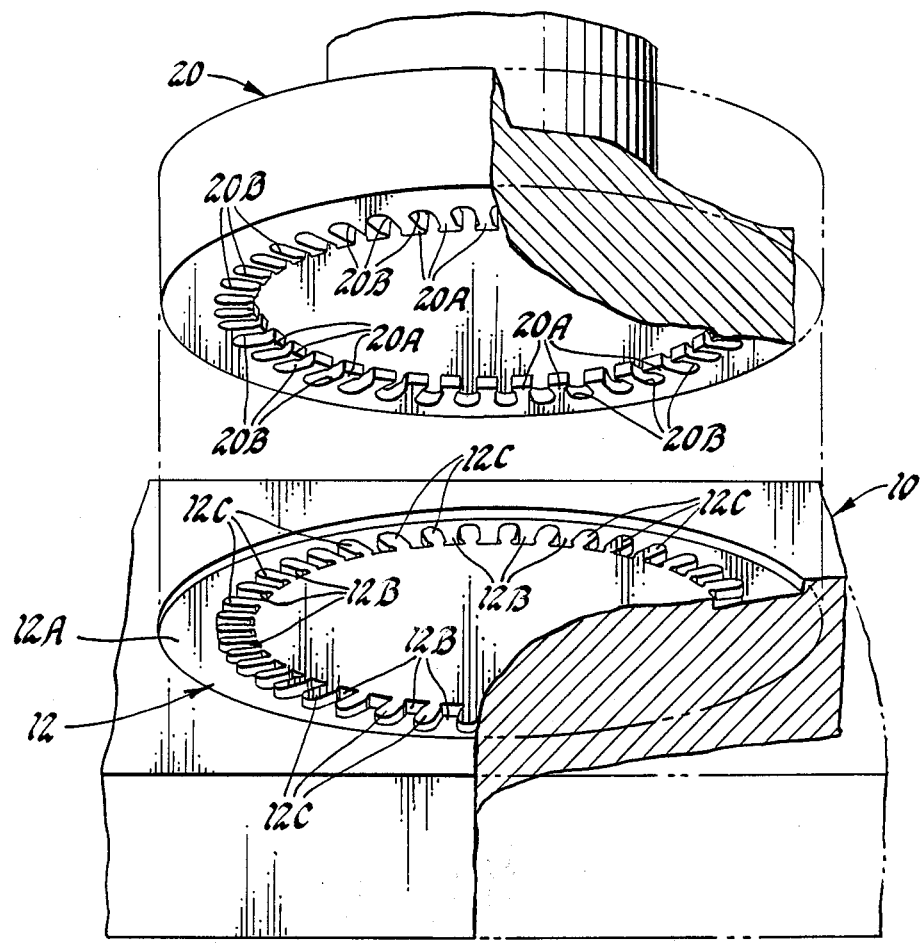
FIG. 3 illustrates a coining punch and die for forming a stator lamination.
Figure 4:
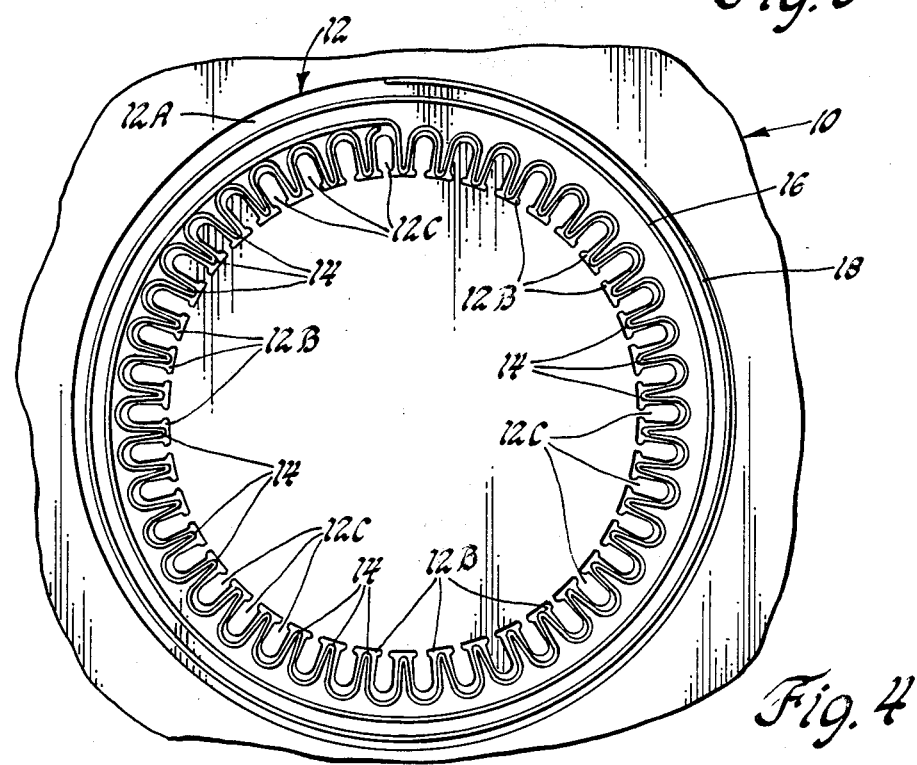
FIG. 4 is a view illustrating the configuration of the die cavity with a length of wire positioned therein just prior to forming the length of wire to the shape of the die cavity.

Referring now to the drawings and more particularly to FIGS. 3 and 4, the reference numeral 10 designates a die of a coining apparatus. The upper face of the die 10 has a die cavity which is generally designated by reference numeral 12 and it is also illustrated in FIG. 4 which is a view looking down on the top end of die 10 with a length of wire placed in the die cavity. The die cavity 12 has the same shape as that of a stator lamination for an alternating current generator that may be of a type used on motor vehicles. A typical outline of such a stator lamination is disclosed in the above-referenced Givan U.S. Pat. No. 3,606,674. The die cavity 12 comprises an annular groove portion 12A which corresponds to the annular yoke portion of a finished stator lamination. The die cavity 12 further has a plurality of radially extending circumferentially spaced grooves 12B which are the exact dimensions of the teeth of a finished stator lamination.

In FIG. 4, a length of steel wire is shown positioned in the die cavity. The length of wire comprises loops 14 which are respectively positioned within the radially extending grooves 12B. Further, the length of steel wire has two circular portions or turns 16 and 18 which are positioned within the annular groove 12A corresponding to the yoke portion of a stator lamination.

In FIG. 3, the punch of the coining apparatus is designated by reference numeral 20 and the punch has alternate teeth and slots 20A and 20B. When the punch and die are brought together the teeth 20A slide into the die cavity grooves 12B while the slots 20B embrace portions 12C of the die 10. As will be described more fully hereinafter the punch 20 and die 10 are brought together to force the metal of the steel wire into the exact configuration of a stator lamination after the coiled wire assembly, shown in FIG. 4, has been placed in the die cavity 12.

Figure 1:
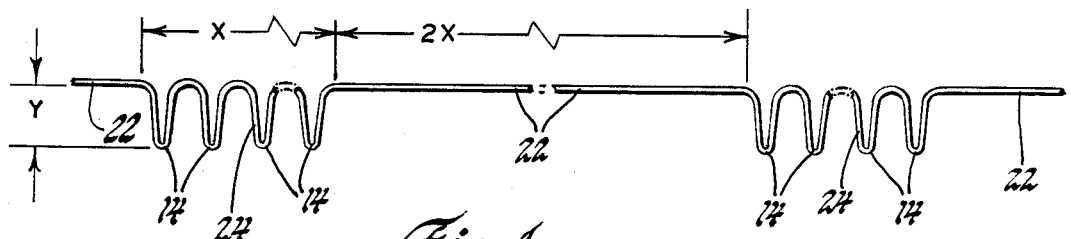
FIG. 1 illustrates a length of steel wire having alternate undulated and straight sections which are subsequently coiled to a configuration that can be placed in a die cavity.

The method of forming the wire into the shape shown in FIG. 4, so that it can be placed in the die cavity 12, will now be described. In performing the method of this invention, steel wire is formed into the shape shown in FIG. 1. As shown in FIG. 1, the length of steel wire has straight portions 22 and undulated portions 24. The undulated portions 24 are comprised of a series of loops 14 which eventually are placed in the radially extending grooves 12B of the die cavity as shown in FIG. 4. Further, the straight portions 22 eventually form the two circumferentially extending portions 16 and 18 that become positioned within the annular portion 12A of the die cavity. The number of loops 14, in a given undulated portion of the wire, is equal in number to the number of stator teeth in the stator lamination. The distance designated as X in FIG. 1 corresponds to the circumference of a stator lamination at the mid-diameter of the yoke portion of the lamination. The straight portion of the wire has a length of 2X and is equal to the length of the two circumferentially extending portions 16 and 18 of the wire as it is finally placed in the die cavity 12. The distance or dimension Y, illustrated in FIG. 1, corresponds to the length of a stator tooth of the lamination.

Figure 2:
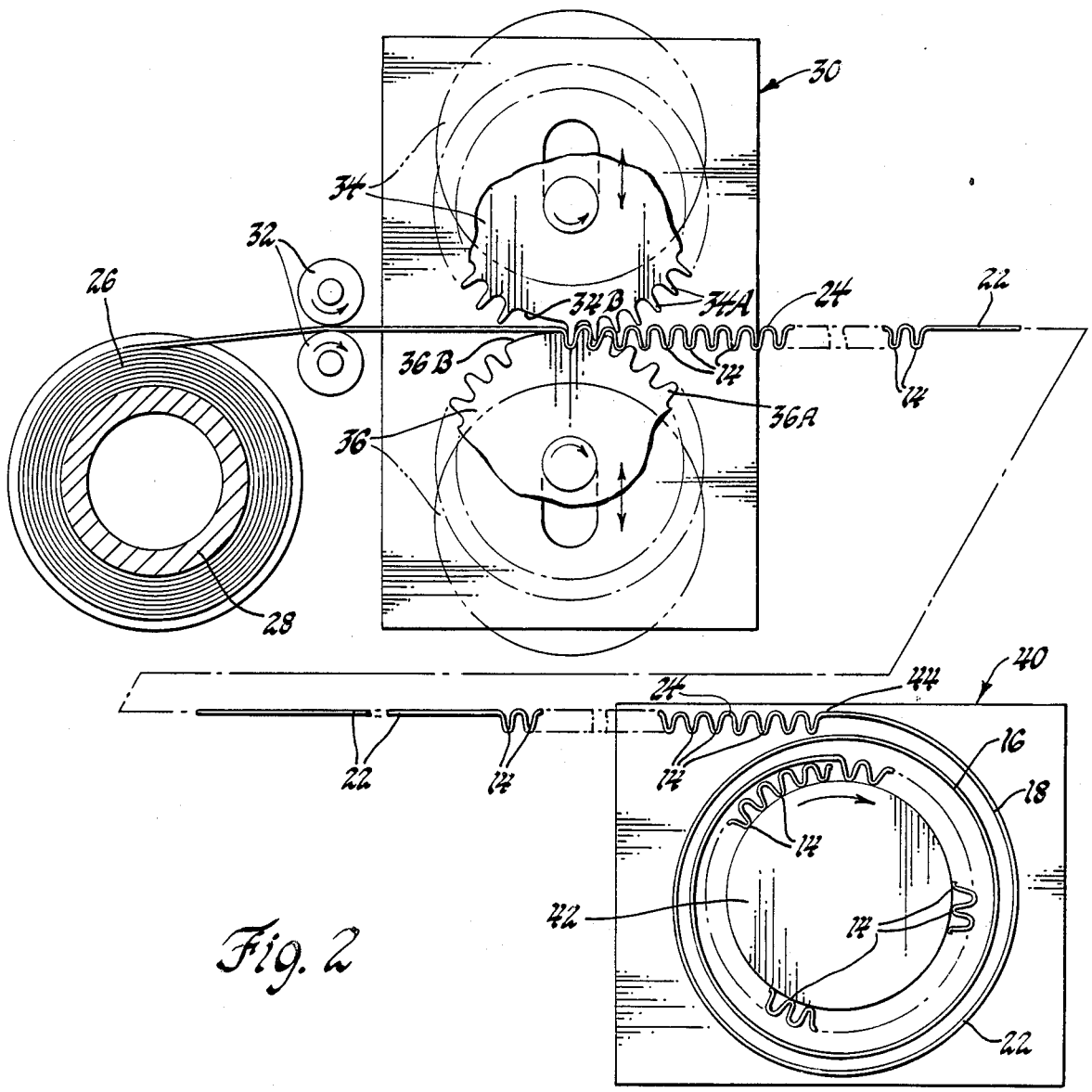
FIG. 2 is a schematic illustration of apparatus for forming undulations or loops in a length of steel wire and for subsequently coiling a length of the wire to the proper size to be received in a die cavity.

The wire, as shown in FIG. 1, can be formed in various ways, one of which is illustrated in FIG. 2. In FIG. 2, a coil of wire is shown and designated by reference numeral 26. The wire is located on a feed reel 28 and is moved through a forming apparatus 30 by power driven feed rolls 32. The forming apparatus comprises a pair of power driven rotatable gear shaped wheels 34 and 36 which can be moved toward and away from each other as indicated by the arrows. When forming the undulated portions 24, shown in FIG. 1, the rotatable gear wheels 34 and 36 are brought together such that the teeth 34A and 36A cooperate to form an undulated portion 24.

The number of teeth 34A and 36A on wheels 34 and 36 is such that the number of loops 14 that are formed in a given undulated portion 24 correspond to the number of teeth of the stator lamination to be formed. The wheels 34 and 36 do not have teeth over short generally arcuately extending portions 34B and 36B as shown in FIG. 2.

When a straight portion 22 is to be formed, the gear wheels 34 and 36 are withdrawn from the metal wire until a length of wire corresponding to the distance 2X, in FIG. 1, is traversed. The gear wheels are withdrawn from the wire when the arcuately extending portions 34B and 36B are in the position shown in FIG. 2 to properly form the wire when a transition from an undulated portion 24 to a straight portion 22 is required. When a straight portion 22 of the proper length has been formed the gear wheels are now brought back into engagement with the wire to form another undulated portion 24. The gear wheels must be in a proper rotative position to begin the formation of the undulated portion 24. The foregoing can be accomplished by measuring the amount of wire that is moving through the forming apparatus 30 and then shifting the gear wheels 34 and 36 toward and away from each other in synchronism with wire movement and controlling the rotative position of the gear wheels to form the steel wire to the configuration shown in FIG. 1.

The steel wire, after being formed by the forming apparatus 30, is fed to a forming or coiling apparatus designated by reference numeral 40. The purpose of the coiling apparatus 40 is to wind the wire into the shape shown in FIGS. 2 and 4. In this regard, the same reference numerals have been utilized in FIG. 2 to identify corresponding parts of the wire in FIGS. 2 and 4. The wire can be coiled by winding it on a cylindrical mandrel designated by reference numeral 42 which may be power driven and which includes means (not illustrated) for gripping a portion of the wire and then rotating to form the coil illustrated in FIGS. 2 and 4. When a length of wire has been coiled by the mandrel 42 it is cut off at a point designated by reference numeral 44 and the coil is then slipped off the mandrel.

The coiled wire assembly, which has the shape illustrated in FIGS. 2 and 4, is axially inserted into the die cavity of the die 10. As shown in FIG. 4, the loops 14 are placed in the radially extending grooves 12B and the two annular turns 16 and 18 are placed in annular groove 12A of die cavity 12. The punch 20 and the die 10 are now brought together with sufficient pressure, for example by a hydraulic press, to cause the wire material to flow and fill out the confines of the die cavity. The die 10 and punch 20 are now separated and the finished coined stator lamination is removed from the die cavity 12.

By way of example, the steel wire that is formed into a lamination can be a 1008 low carbon steel wire having a circular cross section and a diameter of about 0.06 inches. Using this diameter steel wire the die cavity 12 can be dimensioned such that a finished coined lamination has a thickness of about 0.04 inches. These dimensions can be varied and it is apparent that the diameter of the wire will depend upon the volume of the die cavity that is to be filled which in turn depends on the desired thickness and outline of a stator lamination.

As previously described, two turns of wire 16 and 18 are utilized to fill the annular groove 12A of die cavity 12 that forms the annular yoke portion of a stator lamination. The number of turns that are required will depend on the volume of the yoke portion and the diameter of the wire utilized. The volume of the yoke portion is of course related to the thickness of the lamination and the radial dimension of the yoke portion. Moreover, the shape of the wire, as it is placed in die cavity 12, can be varied as long as the wire material completely fills the die cavity after the punch 20 and die 10 are brought together.

The embodiments of the invention in which an exclusive property or privilege is claimed are defined as follows:

1. A method of manufacturing a lamination for electrical apparatus having a plurality of radially extending alternate slots and teeth and an annular yoke portion, the steps comprising, placing wire of magnetic material into a die cavity that has a plurality of radially extending grooves communicating with an annular groove such that loops of wire are positioned in the radially extending grooves and at least one circular turn of wire is placed in the annular groove, the radially extending grooves having a shape corresponding to the teeth of a lamination and the annular groove corresponding to the yoke portion of a lamination, and then deforming the wire to the shape of the die cavity.

2. A method of manufacturing a lamination for electrical apparatus having a plurality of radially extending wire receiving slots and a yoke portion, the steps comprising, forming a length of wire of magnetic material into a generally annular configuration having an inner turn comprising an undulated portion defined by a series of circumferentially spaced loops and at least one outer turn, placing the formed wire into a die cavity that has a plurality of radially extending grooves communicating with an annular groove such that the loops of the undulated portion are located in the radially extending grooves of the die cavity and the outer turn is located in the annular groove of the die cavity, and applying pressure to the wire to cause it to take the shape of the die cavity, the loops of the undulated portion forming teeth that define the wire receiving slots and the outer turn forming the yoke of the lamination.

3. A method of manufacturing a stator lamination for a dynamoelectric machine having a plurality of radially extending wire receiving slots extending inwardly from an outer annular yoke, the steps comprising, forming a length of steel wire into a coil having an inner turn comprising an undulated portion defined by radially extending circumferentially spaced loops of wire and a plurality of outer circular turns, placing the formed wire into a die cavity that has a plurality of radially extending grooves that communicate with an outer annular groove and which extend inwardly therefrom such that the loops of the undulated portion are located in the radially extending grooves of the die cavity and the outer turns are located in the annular groove of the die cavity, and then applying pressure to said wire to deform the wire into the shape of the die cavity, the loops of the undulated portion forming teeth that define the wire receiving slots and the outer turns forming the yoke of the lamination.

* * * * *